United States Patent
Yang et al.

(10) Patent No.: US 11,252,636 B2
(45) Date of Patent: Feb. 15, 2022

(54) SYSTEM AND METHOD FOR ESTABLISHING BLUETOOTH MESH NETWORK

(71) Applicant: Delta Electronics, Inc., Taoyuan (TW)

(72) Inventors: Yu-Chung Yang, Taoyuan (TW); Chao-Chun Tseng, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 31 days.

(21) Appl. No.: 16/552,812

(22) Filed: Aug. 27, 2019

(65) Prior Publication Data

US 2020/0367138 A1    Nov. 19, 2020

Related U.S. Application Data

(60) Provisional application No. 62/848,930, filed on May 16, 2019.

(51) Int. Cl.
*H04W 40/24* (2009.01)
*H04W 84/18* (2009.01)

(52) U.S. Cl.
CPC ......... *H04W 40/246* (2013.01); *H04W 84/18* (2013.01)

(58) Field of Classification Search
CPC ................. H04W 40/246; H04W 84/18
See application file for complete search history.

(56) References Cited

U.S. PATENT DOCUMENTS

| | | | | |
|---|---|---|---|---|
| 2014/0219091 A1* | 8/2014 | Hellhake | .................. | H04L 45/32 370/235 |
| 2016/0353253 A1* | 12/2016 | Cherian | ............ | H04W 52/0216 |
| 2017/0238398 A1 | 8/2017 | Ho et al. | | |
| 2017/0245351 A1 | 8/2017 | Leinen et al. | | |
| 2018/0049122 A1* | 2/2018 | Di Marco | ............. | H04W 40/24 |
| 2018/0160301 A1* | 6/2018 | Kwon | .................... | H04W 12/06 |
| 2018/0184367 A1 | 6/2018 | Yeon et al. | | |
| 2020/0068656 A1* | 2/2020 | Yang | ..................... | H04W 76/14 |

FOREIGN PATENT DOCUMENTS

| | | |
|---|---|---|
| CN | 107846674 A | 3/2018 |
| CN | 109479351 A | 3/2019 |
| CN | 109673014 A | 4/2019 |

OTHER PUBLICATIONS

Office Action dated Jan. 19, 2021 in JP Application No. 2019-220833 (3 pages).
Office Action w/Search Report dated Dec. 31, 2020 in TW Application No. 108142048 (4 pages).
Extended European Search Report dated Apr. 9, 2020 in EP Application No. 19201181.5 (9 pages).

* cited by examiner

*Primary Examiner* — Yuwen Pan
*Assistant Examiner* — Fatuma G Sherif
(74) *Attorney, Agent, or Firm* — Muncy, Geissler, Olds & Lowe, P.C.

(57) ABSTRACT

A method and system for establishing a Bluetooth mesh network are provided. The method for establishing a Bluetooth mesh network includes the steps of broadcasting the configuration packet to a plurality of controlled devices to establish a Bluetooth mesh network; receiving at least one response packet from at least one of the controlled devices; and transmitting control setting information to the at least one of the controlled devices according to the received response packet.

27 Claims, 2 Drawing Sheets

SYSTEM AND METHOD FOR ESTABLISHING BLUETOOTH MESH NETWORK

CROSS REFERENCE TO RELATED APPLICATIONS

This application claims priority of U.S. Provisional Patent Application No. 62/848,930, filed on May 16, 2019, the entirety of which is incorporated by reference herein.

BACKGROUND OF THE INVENTION

Field of the Invention

The invention generally relates to a Bluetooth mesh network technology, and more particularly, to the Bluetooth mesh network technology for establishing the Bluetooth mesh network by broadcasting a configuration packet to a plurality of controlled devices through a control device.

Description of the Related Art

In the traditional Bluetooth mesh network technology, when the user wants to control or set multiple devices through the Bluetooth mesh network, the user needs to set one device at a time, or the user needs to set a switch device first, and then uses the switch device to control the multiple devices. Therefore, the process for controlling or setting the devices is inefficient.

BRIEF SUMMARY OF THE INVENTION

A method and a system for establishing a Bluetooth mesh network are provided to overcome the problems mentioned above.

An embodiment of the invention provides a method for establishing a Bluetooth mesh network. The method for establishing a Bluetooth mesh network comprises steps of broadcasting a configuration packet to a plurality of controlled devices to establish a Bluetooth mesh network; receiving at least one response packet from at least one of the controlled devices; and transmitting control setting information to the at least one of the controlled devices according to the received response packet.

In some embodiments, the method for establishing a Bluetooth mesh network further comprises that the control device is triggered to generate the configuration packet by pressing a single key or a key combination on the control device, by an instruction of an application, or by receiving a trigger signal wirelessly.

In some embodiments, if the number of response packets is greater than or equal to a first default value, the control device enters a control state to transmit the control setting information. In some embodiments, if the number of response packets is lower than a first default value and greater than or equal to a second value, a timer on the control device is enabled, and after the timer expires, the control device enters a control state, wherein the first default value is greater than the second default value. In some embodiments, if the number of response packets is lower than a second default value, the control device is reset.

An embodiment of the invention provides a system for establishing a Bluetooth mesh network. The system comprises a plurality of controlled devices and a control device. The control device is configured to generate a configuration packet according to mesh network information to broadcast the configuration packet to the plurality of controlled devices to establish a Bluetooth mesh network and to transmit control setting information to at least one controlled device that transmits response packet.

Other aspects and features of the invention will become apparent to those with ordinary skill in the art upon review of the following descriptions of specific embodiments of method and system for establishing a Bluetooth mesh network.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
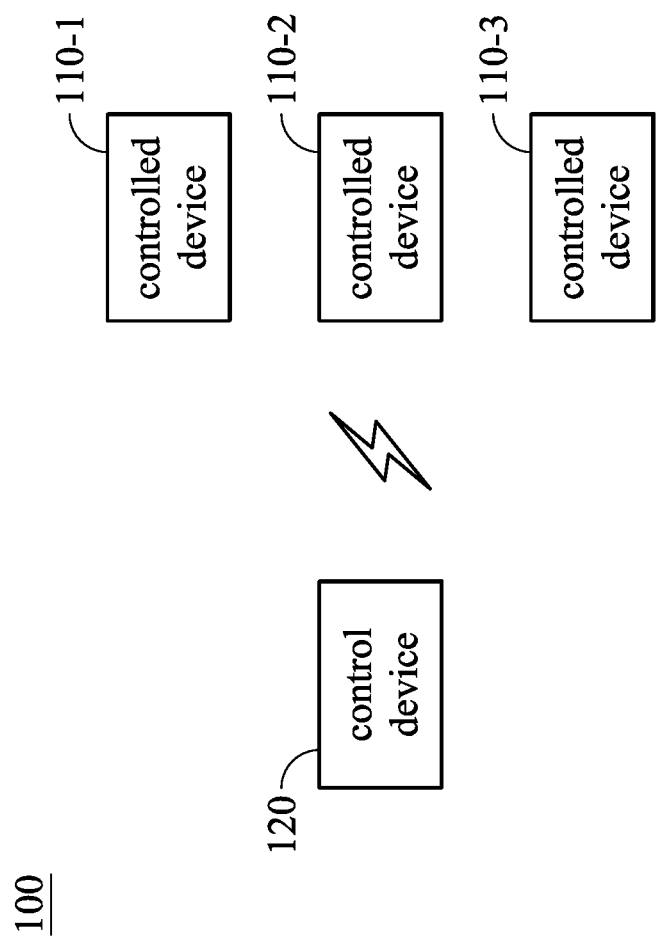
FIG. 1 is a block diagram of a system 100 for establishing Bluetooth mesh network according to an embodiment of the invention.

FIG. 1 is a block diagram of a system 100 for establishing Bluetooth mesh network (or Bluetooth Low Energy (BLE) mesh network) according to an embodiment of the invention. As shown in FIG. 1, the system 100 for establishing Bluetooth mesh network may comprise a plurality of controlled devices 110-1~110-3 and a control device 120. It should be noted that in order to clarify the concept of the invention, FIG. 1 is a simplified block diagram in which only the elements relevant to the invention are shown. However, the invention should not be limited to what is shown in FIG. 1. The system 100 for establishing Bluetooth mesh network may also comprise other controlled devices or other groups of controlled devices.

According to an embodiment of the invention, the controlled devices 110-1~110-3 may be lamps, curtains, shutters, or rolling doors, but the invention should not be limited thereto. According to an embodiment of the invention, the control device 120 may be a switch device or an electronic device (e.g. mobile phone, tablet, note book, but the invention should not be limited thereto). According to an embodiment of the invention, if the control device 120 is a switch device, the control device 120 may communicate with the controlled devices 110-1~110-3 through advertising (ADV) bearer layer. According to an embodiment of the invention, if the control device 120 is a mobile phone, the control device 120 may communicate with the controlled devices 110-1~110-3 through a generic attribute (GATT) bearer layer.

According to an embodiment of the invention, when the control device 120 may establish a Bluetooth mesh network with the controlled devices 110-1~110-3, the control device 120 (e.g. a switch device) will be triggered to generate the configuration packet.

According to an embodiment of the invention, the control device 120 is triggered when the user presses a single key or a key combination on the control device 120. According to an embodiment of the invention, the key combination may be regarded as pressing a key on the control device 120 a default number of times, or it may be regarded as pressing a plurality of keys on the control device 120, but the invention should not be limited thereto.

According to another embodiment of the invention, the control device 120 is triggered by an instruction of an application which is run or operated by the control device 120 (e.g. a mobile phone).

According to an embodiment of the invention, the control device 120 is triggered by receiving a trigger signal wirelessly (i.e. through wireless communication technology). The trigger signal may be transmitted from an electronic device, e.g. a cell phone, a notebook or a tablet, but the invention should not be limited there to.

When the control device 120 is triggered, the control device 120 may generate a configuration packet according to mesh network information. The mesh network information may comprise the mesh network setting information related to establishing the mesh network. In addition, the configuration packet generated by the control device 120 may carry the mesh network setting information of the group of mesh network information. According to an embodiment of the invention, the mesh network setting information may comprise a network key, an application key and a unicast address.

When the control device 120 generates the configuration packet, the control device 120 may broadcast the configuration packet. According to an embodiment of the invention, the control device 120 may broadcast the configuration packet for a first default time period (e.g. the control device 120 may broadcast the configuration packet for 60 seconds).

According to an embodiment of the invention, when the user sets the controlled devices 110-1~110-3, the controlled devices 110-1~110-3 need to listen to determine whether there is a configuration packet broadcast by the control device 120, and after the configuration packet is broadcasted, the controlled devices 110-1~110-3 may be disabled first, and then enabled again. In an embodiment of the invention, the controlled devices 110-1~110-3 may be disabled and enabled by the user controlling the switches corresponding to the controlled devices 110-1~110-3. In another embodiment of the invention, the controlled devices 110-1~110-3 may be disabled and enabled by the user controlling the control device 120. For example, if the controlled devices 110-1~110-3 are lamps, when the lamps need to be set, the user may turn off the lamps first, and then turn on the lamps again.

According to another embodiment of the invention, when the user sets the controlled devices 110-1~110-3, the controlled devices 110-1~110-3 need to listen to determine whether there is a configuration packet broadcast by the control device 120, and after the configuration packet is broadcasted, power of the controlled devices 110-1~110-3 may be turned off first, and then power of the controlled devices 110-1~110-3 may be turned on again. In an embodiment of the invention, power of the controlled devices 110-1110-3 may be turned off and turned on by the user controlling the switches corresponding to the controlled devices 110-1~110-3. In another embodiment of the invention, power of the controlled devices 110-1~110-3 may be turned off and turned on by the user controlling the control device 120. For an example, if the controlled devices 110-1-110-3 are shutters, when the shutters need to be set, the user may control the control device 120 to turn off power of the shutters first, and then control the control device 120 to turn on power of the shutters again. It should be noted that the controlled devices 110-1110-3 may be disabled or enabled by another method, i.e. the invention should not be limited by the above embodiments.

According to an embodiment of the invention, when the controlled devices 110-1110-3 are enabled again (or power of the controlled devices 110-1~110-3 is turned on again), the controlled devices 110-1~110-3 may start to listen to determine whether there is a configuration packet broadcast by the control device 120. According to another embodiment of the invention, after the controlled devices 110-1~110-3 are enabled again (or power of the controlled devices 110-1~110-3 is turned on again) for a second default time period, the controlled devices 110-1~110-3 may start to listen to determine whether there is a configuration packet broadcast by the control device 120. For example, after the controlled devices 110-1~110-3 are enabled again for 10 seconds, the controlled devices 110-1~110-3 may start to listen to determine whether there is a configuration packet broadcast by the control device 120, but the invention should not be limited thereto. When one or more of the controlled devices 110-1~110-3 determine there is the configuration packet broadcast by the control device 120, the controlled devices listening to the configuration packet may decrypt the configuration packet to obtain the information carried by the configuration packet. Then, the controlled devices listening to the configuration packet may perform a mesh network setting according to the information carried by the configuration packet. In addition, the controlled devices listening to the configuration packet may respond with a response packet to the control device 120. For example, if the controlled device 110-1 determines there is the configuration packet, the controlled device 110-1 may perform a mesh network setting according to the information carried by the configuration packet, and respond with a response packet to the control device 120.

According to an embodiment of the invention, the response packet may comprise the address of the controlled device and the related settings of the controlled device. For example, if the controlled device is lamp, the related settings may comprise the luminosity of the controlled device, color temperature of the controlled device, the dimming level of the controlled device, but the invention should not be limited thereto. In another example, if the controlled device is shutters, the related settings may comprise the rotation angles of the slats of the shutters or the raising length of the slats of the shutters, but the invention should not be limited thereto.

According to an embodiment of the invention, during the first default time period, the control device 120 may determine whether the number of controlled devices which respond with the response packets is greater than or equal to a first default value (i.e. whether the number of response packets received by the control device 120 is greater than or equal to a first default value) and determine whether the number of controlled devices which respond with the response packets is lower than a second default value (i.e. whether the number of response packets received by the control device 120 is lower than a second default value), wherein the first default value is greater than the second default value.

If the number of response packets received by the control device 120 is greater than or equal to the first default value, the control device 120 may enter a control state. For example, if the first default value is 2, when the control device 120 has received two response packets from two of the controlled devices 110-1~110-3, the control device 120 may enter a control state. In the control state, the control device 120 may generate a control setting information according to the information (i.e. the address of the controlled device and the related settings of the controlled device) carried by the response packet, and the control device 120 may transmit the control setting information to the controlled devices which respond with the response packets to control these controlled devices.

If the number of response packets received by the control device 120 is lower than a second default value, the control device will be reset (e.g. a reset signal will be generated and transmitted to the control device 120). According to an embodiment of the invention, the reset signal may be generated by pressing a key on the control device 120 a default number of times, or it may be generated by pressing a plurality of keys on the control device 120, but the invention should not be limited thereto. According to another embodiment of the invention, the reset signal may be generated by an instruction of the application operated in the control device 120. In an embodiment of the invention, after the control device 120 being reset (e.g. receives the reset signal), the control device 120 may wait to be triggered to broadcast the configuration packet again. In another embodiment of the invention, after the control device 120 being reset (e.g. receives the reset signal), the control device 120 may wait to be triggered again to generate a new configuration packet according to a new group of mesh network information, and broadcast the new configuration packet.

If the number of response packets received by the control device 120 is lower than the first default value and greater than or equal to the second value, a timer on the control device 120 is enabled. After the timer expires, the control device 120 may enter a control state.

According to an embodiment of the invention, in the control state, when a new controlled device needs to be added to the Bluetooth mesh network, the control device 120 will be triggered (e.g. by pressing the key on the control device 120 again or operating the application of the control device 120) to broadcast the configuration packet again to add a new controlled device to the Bluetooth mesh network. For example, when the control device 120 in the control state, if another controlled device (e.g. a controlled device 110-4 (not shown in figures)) needs to be set, the control device 120 will be triggered to broadcast the configuration packet again to add the controlled device 110-4 to the Bluetooth mesh network.

Figure 2:
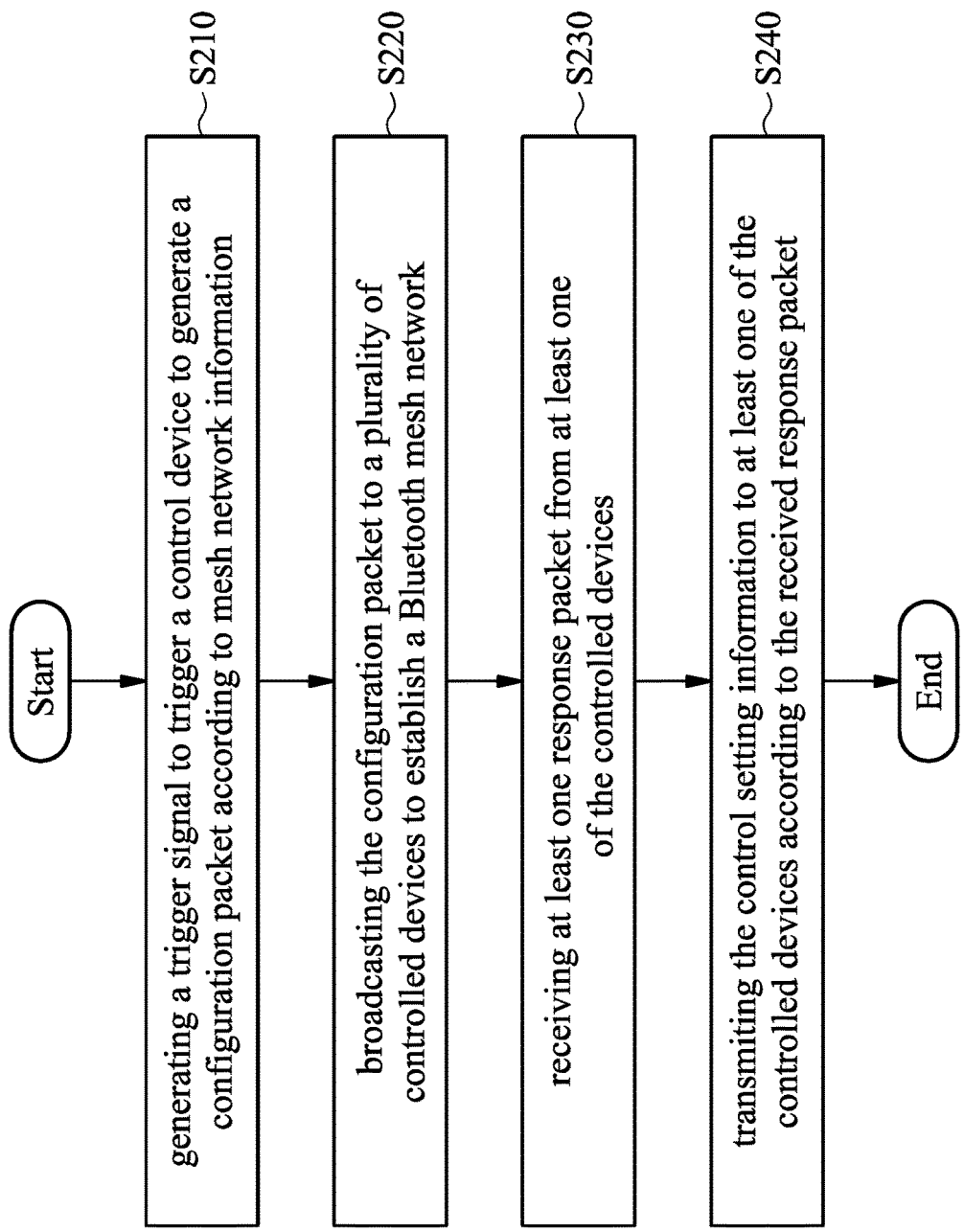
FIG. 2 is a flow chart 200 illustrating a method for establishing Bluetooth mesh network according to an embodiment of the invention.

FIG. 2 is a flow chart 200 illustrating a method for establishing Bluetooth mesh network (or Bluetooth Low Energy (LE) mesh network) according to an embodiment of the invention. The method for establishing Bluetooth mesh network can be applied to system 100 for establishing Bluetooth mesh network. As shown in FIG. 2, in step S210, a control device of the system 100 is triggered to generate a configuration packet according to mesh network information. In step S220, the control device broadcasts the configuration packet to a plurality of controlled devices of the system 100 to establish a Bluetooth mesh network. In step S230, the control device receives at least one response packet from at least one of the controlled devices. In step S240, the control device transmits the control setting information to the at least one of the controlled devices according to the received response packet.

In some embodiments of the invention, the method for establishing Bluetooth mesh network further comprises that the control device is triggered to generate the configuration packet by pressing a single key or a key combination on the control device. In some embodiments of the invention, the method for establishing Bluetooth mesh network further comprises that the control device is triggered to generate the configuration packet by an instruction of an application. In some embodiments of the invention, the method for establishing Bluetooth mesh network further comprises that the control device is triggered to generate the configuration packet by receiving a trigger signal wirelessly.

In some embodiments of the invention, the method for establishing Bluetooth mesh network further comprises that the control device broadcast the configuration packet for a first default time period. In some embodiments of the invention, the method for establishing Bluetooth mesh network further comprises that after the configuration packet is broadcast, the controlled devices are disabled and then enabled again. In some embodiments of the invention, the method for establishing Bluetooth mesh network further comprises that after the configuration packet is broadcast, power of the controlled devices is turned off first, and then power of the controlled device is turned on again. In some embodiments of the invention, the method for establishing Bluetooth mesh network further comprises that after the controlled devices being enabled again (or power of the controlled devices is turned on again), the controlled devices may start to listen to determine whether there is a configuration packet broadcasted by the control device. In some embodiments of the invention, the method for establishing Bluetooth mesh network further comprises that after the controlled devices being enabled again (or power of the controlled devices is turned on again) for a second default time period, the controlled devices listen to determine whether there is a configuration packet broadcasted by the control device. In some embodiments of the invention, the method for establishing Bluetooth mesh network further comprises that when the controlled devices determine there is configuration packet, the controlled devices may perform a mesh network setting according to the information carried by the configuration packet, and respond with the response packet or the response packets to the control device.

In some embodiments of the invention, the method for establishing Bluetooth mesh network further comprises that during the first default time period, the control device determines whether the number of controlled devices which respond with the response packets is greater than or equal to a first default value (i.e. whether the number of response packets received by the control device is greater than or equal to a first default value) and determines whether the number of controlled devices which respond with the response packets is lower than a second default value (i.e. whether the number of response packets received by the control device is lower than a second default value), wherein the first default value is greater than the second default value.

If the number of response packets received by the control device is greater than or equal to the first default value, the control device enters a control state to transmit control setting information.

If the number of response packets received by the control device is lower than a second default value, the control device is reset (e.g. a reset signal will be generated). In an embodiment of the invention, after the control device being reset, the control device may wait to be triggered to broadcast the configuration packet again. In another embodiment of the invention, after the control device being reset signal, the control device may wait to be triggered again to generate a new configuration packet according to a new group of mesh network information, and broadcast the new configuration packet.

If the number of response packets received by the control device is lower than the first default value and greater than or equal to the second value, a timer on the control device is enabled. After the timer expires, the control device may enter a control state.

In some embodiments of the invention, the method for establishing Bluetooth mesh network further comprises that in the control state, the control device is triggered to broadcast the configuration packet again to generate a new controlled device needs to be added to the Bluetooth mesh network.

In the method for establishing Bluetooth mesh network provided in the invention, the control device can be triggered to broadcast the configuration packet to every controlled device at the same time to establish the Bluetooth mesh network with the controlled devices. Further, in the method for establishing Bluetooth mesh network provided in the invention, the controlled devices listening to the configuration packet may respond with the response packets to the control device. Therefore, in the method for establishing Bluetooth mesh network provided in the invention, the process for controlling or setting the group of controlled devices will be more efficient.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for establishing a Bluetooth mesh network, comprising:
   broadcasting, by a control device, a configuration packet to a plurality of controlled devices to establish a Bluetooth mesh network;
   receiving, by the control device, at least one response packet from at least one of the controlled devices;
   determining, by the control device, the number of response packets;
   if the number of response packets is greater than or equal to a first default value, entering, by the control device, a control state to transmit control setting information to the controlled devices which respond with the response packets;
   if the number of response packets is lower than the first default value and greater than or equal to a second default value, enabling, by the control device, a timer on the control device, wherein the first default value is greater than the second default value; and
   if the number of response packets is lower than the second default value, resetting the control device.

2. The method for establishing a Bluetooth mesh network of claim 1, wherein the configuration packet is generated according to mesh network information.

3. The method for establishing a Bluetooth mesh network of claim 2, wherein the control device is triggered to generate the configuration packet by pressing a single key or a key combination on the control device, by an instruction of an application, or by receiving a trigger signal wirelessly.

4. The method for establishing a Bluetooth mesh network of claim 2, wherein the mesh network information comprises mesh network setting information related to establishing the mesh network, wherein the mesh network setting information comprises a network key, an application key and a unicast address.

5. The method for establishing a Bluetooth mesh network of claim 1, further comprising:
   broadcasting, by the control device, the configuration packet for a first default time period.

6. The method for establishing a Bluetooth mesh network of claim 1, further comprising:
   after broadcasting the configuration packet, disabling the controlled devices and then enabling the controlled devices again.

7. The method for establishing a Bluetooth mesh network of claim 6, further comprising:
   after the controlled devices being enabled again or power of the controlled devices being turned on again, the controlled devices listen to determine whether there is configuration packet broadcasted by the control device.

8. The method for establishing a Bluetooth mesh network of claim 1, further comprising:
   after broadcasting the configuration packet, turning off power of the controlled devices, and then turning on power of the controlled devices again.

9. The method for establishing a Bluetooth mesh network of claim 8, further comprising:
   after the controlled devices being enabled again or power of the controlled devices being turned on again, the controlled devices listen to determine whether there is configuration packet broadcasted by the control device.

10. The method for establishing a Bluetooth mesh network of claim 8, further comprising:
    when the controlled devices determine there is configuration packet broadcasted by the control device, the controlled device performs a mesh network setting according to the configuration packet and respond with the response packets to the control device.

11. The method for establishing a Bluetooth mesh network of claim 1, further comprising:
after the timer expires, the control device entering the control state.

12. The method for establishing a Bluetooth mesh network of claim 1, further comprising:
after the control device being reset, triggering the control device to broadcast the configuration packet again.

13. The method for establishing a Bluetooth mesh network of claim 1, further comprising:
after the control device being reset, triggering the control device to generate a new configuration packet according to a new group of mesh network information, and broadcasting the new configuration packet.

14. The method for establishing a Bluetooth mesh network of claim 1, further comprising:
triggering the control device to broadcast the configuration packet again to add a new controlled device to the Bluetooth mesh network.

15. A system for establishing a Bluetooth mesh network, comprising:
a plurality of controlled devices; and
a control device, configured to generate a configuration packet according to mesh network information, broadcast the configuration packet to the plurality of controlled devices to establish a Bluetooth mesh network, receive at least one response packet from at least one of the controlled devices, and determine the number of response packets,
wherein the control device is configured to enter a control state to transmit the control setting information to the controlled devices which respond with the response packets if the number of response packets is greater than or equal to a first default value,
wherein the control device is configured to enable a timer on the control device if the number of response packets is lower than the first default value and greater than or equal to a second default value, wherein the first default value is greater than the second default value; and
wherein the control device is reset if the number of response packets is lower than the second default value.

16. The system for establishing a Bluetooth mesh network of claim 15, wherein the control device is configured to be triggered to generate a configuration packet by pressing a single key or a key combination on the control device, running an application in the control device, or receiving a trigger signal wirelessly.

17. The system for establishing a Bluetooth mesh network of claim 15, wherein the mesh network information comprises mesh network setting information related to establishing the mesh network, wherein the mesh network setting information comprises a network key, an application key and a unicast address.

18. The system for establishing a Bluetooth mesh network of claim 15, wherein the control device is configured to broadcasts the configuration packet for a first default time period.

19. The system for establishing a Bluetooth mesh network of claim 15, wherein the controlled devices are configured to be disabled and then enabled again when receiving the broadcasted configuration packet.

20. The system for establishing a Bluetooth mesh network of claim 19, wherein the controlled devices are configured to listen to determine whether there is the configuration packet broadcast by the control device when the controlled devices are enabled again or power to the controlled devices is turned on again.

21. The system for establishing a Bluetooth mesh network of claim 15, wherein the controlled devices are configured to be turned power off, and then turned power on again when receiving the broadcasted configuration packet.

22. The system for establishing a Bluetooth mesh network of claim 21, wherein the controlled devices are configured to listen to determine whether there is the configuration packet broadcast by the control device when the controlled devices are enabled again or power to the controlled devices is turned on again.

23. The system for establishing a Bluetooth mesh network of claim 22, wherein the controlled devices are configured to perform a mesh network setting according to the configuration packet and respond with the response packets to the control device when the controlled devices determines there is the configuration packet broadcasted by the control device.

24. The system for establishing a Bluetooth mesh network of claim 15, wherein the control device is configured to enter the control state after the timer is expired.

25. The system for establishing a Bluetooth mesh network of claim 15, wherein the control device is further configured to be triggered to broadcast the configuration packet again after the control device being reset.

26. The system for establishing a Bluetooth mesh network of claim 15, wherein after the control device being reset, the control device is further configured to generate a new configuration packet according to a new mesh network information and broadcast the new configuration packet.

27. The system for establishing a Bluetooth mesh network of claim 15, wherein the control device is further configured to broadcast the configuration packet again for adding a new controlled device to the Bluetooth mesh network.

* * * * *